ACCESSING SYSTEM FOR LARGE SERIAL MEMORIES

Filed June 29, 1964 5 Sheets-Sheet 1

INVENTORS
REX RICE
RALPH F. SCHAUER

BY [signature]

ATTORNEY

ACCESSING SYSTEM FOR LARGE SERIAL MEMORIES

ACCESSING SYSTEM FOR LARGE SERIAL MEMORIES

Filed June 29, 1964 5 Sheets-Sheet 5

United States Patent Office 3,366,928
Patented Jan. 30, 1968

3,366,928

ACCESSING SYSTEM FOR LARGE SERIAL MEMORIES

Rex Rice, Menlo Park, Calif., and Ralph F. Schauer, Putnam Valley, N.Y., assignors to International Business Machines Corporation, a corporation of New York Filed June 29, 1964, Ser. No. 378,560
11 Claims. (Cl. 340—172.5)

ABSTRACT OF THE DISCLOSURE

The present system accomplishes the accessing of large serial memories such as multi-tape memories having a large number of individual tape units in which it is desired to access the given record within any one of the tape units in a somewhat random manner. The system utilizes a conventional 3D random access memory as a mapping memory in which a complete mapping table for this serial memory is stored. The system further includes a plurality of tape units each having a built-in Block counter which keeps track of the particular block on which a tape unit is currently sitting. The system data is organized in this serial memory in "Named" batches wherein each batch contains a plurality of conventional blocks, said blocks being separated by a block gap on the tape and wherein each block is composed of a plurality of separate records and each record is separated by a characteristic record indicator. Each "Named" batch of data is addressable in the Main Memory and the information stored in Main Memory relative thereto includes the fact that the information desired is in the external serial tape unit. It further specifies the tape unit number and subsequently a list of the block numbers and the number of the records in each particular block which information is repeated for the entire data batch. The system when given a command to retrieve a certain word within a "Named" data batch only requires the record number relative to the beginning of the batch as well as the name of the batch.

The present invention relates to a system for rapidly accessing data within large serial memories, such as tape units. More particularly, it relates to such a system wherein special hardware and searching procedures are used together with a formated tape organization to rapidly enter said memories at a desired location and increment searching therethrough in large steps.

In present day computer systems, many types of memories or storage systems are available. Various systems have their own respective strong points and weaknesses. In any such systems, the major strong points usually are expressed in low storage costs per bit and a high speed of access to any given point within the memory. The weak points of such a memory may usually be stated as the converse of the above, i.e., high costs per bit and slow access time. Considering memories in general, the usual three dimensional random access, word oriented core memory has by far the fastest access time and said access is completely random, wherein any machine word in the organization may be accessed as rapidly as any other assuming, of course, that the proper address be given. However, such memories together with the various reading and writing circuitry are extremely expensive and accordingly, are used only where their high speed is of utmost importance and the expense accordingly justified.

The second type of memory often used is the multiple magnetic disc type of memory where either side of a plurality of magnetizable discs may be accessed by appropriate addressing means and hardware. Thus, the disc type memory may be considered as broken into segments, any one of which may be addressed, i.e., a disc or particular side of same, and further, a track within the disc may be randomly accessed. However, the accessing of such a disc memory is neither so completely randomly accessible as with the above core storage memory nor is the speed of access anywhere near as great since the accessing is usually accomplished largely by mechanical means such as moving tape heads. The third most common form of memory is the standard tape unit wherein a tape may have one or more tracks. In such tape memories, the cost per bit of storage is undoubtedly the cheapest type of storage available, however, the access time to any given location within a tape is necessarily quite long as with conventional systems, the tapes are serially scanned from a beginning point in each tape whenever such tape is called on for information.

It has now been found that a greatly improved system may be achieved for increasing the speed of access for large multiple tape memories and the like. The time required for accessing a given record within a large serial memory may be greatly reduced by keeping a record or map of all data batches within said memory according to name, providing means for accessing the initial portion of a "named" batch of data and for rapidly searching within said batch in accordance with organization or mapping tables for said data contained in said map.

By separating all of the data on individual record tapes into blocks and then into records within each block and by listing all blocks and the number of records within said blocks in said map table according to which "named" batch the data belongs, extremely rapid access of a given record within a data tape may be achieved.

While the present invention is directed primarily towards magnetic tape memories, it is to be understood that the principles could apply equally to paper tape, wire, disc and various other serial type memories.

It is accordingly a primary object of the present invention to provide a system to implement the high speed searching of large serial memories.

It is a further object to provide such a system wherein a special memory structure and mapping techniques are utilized to facilitate such high speed access.

It is yet another object to provide special hardware and timing circuitry for accessing data in such large serial memories.

It is another object of the invention to provide such a system which may be controlled from an external program provided only with a name of a batch of data and a record number indicating which record the desired portion of data comprises in the particular batch starting with the beginning thereof.

The foregoing and other objects, features and advantages of the invention will be apparent from the following more particular description of preferred embodiments of the invention as illustrated in the accompanying drawings.

Figures 4, 4A:
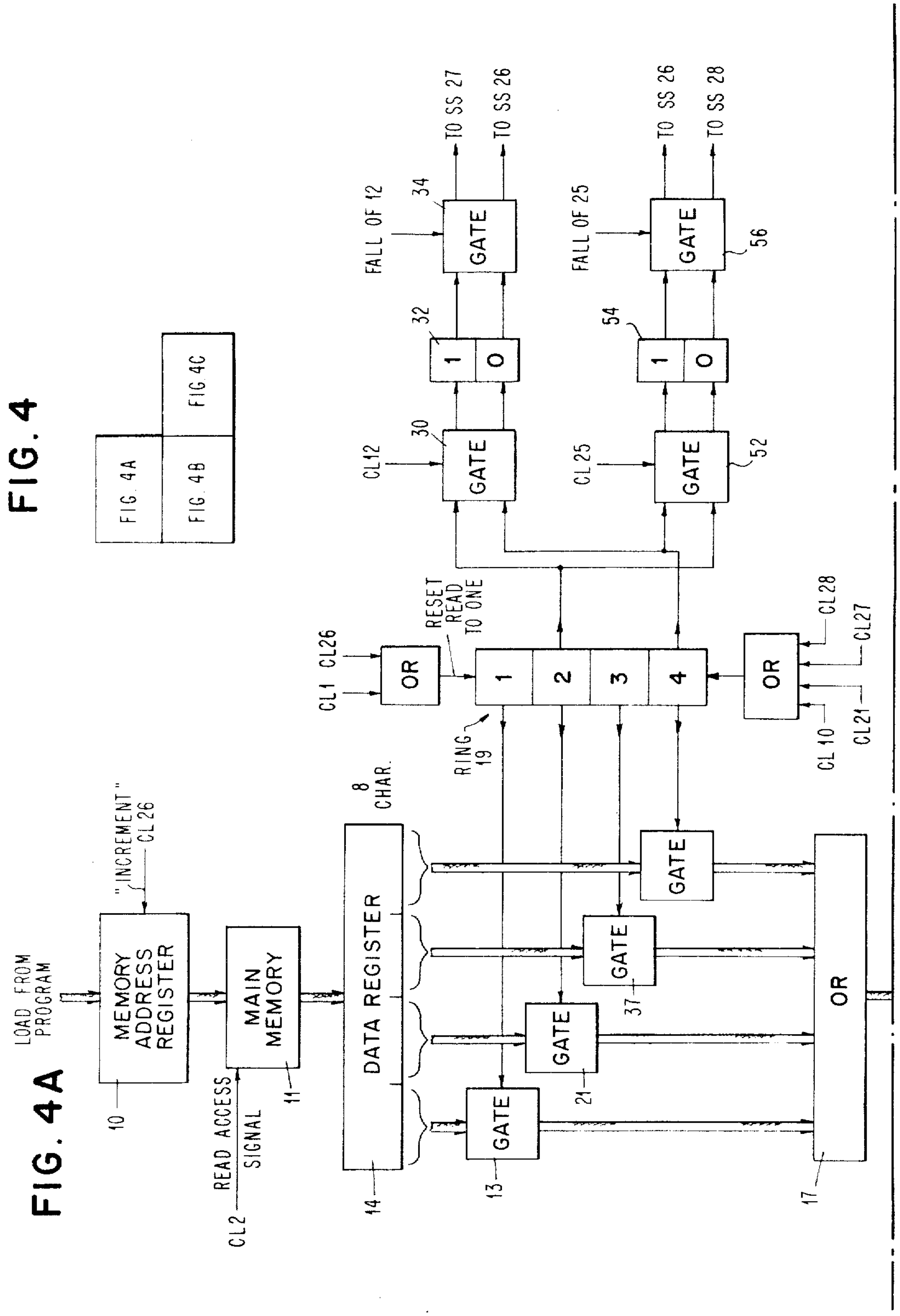
FIGURE 4 is a format diagram showing how FIGURES 4*a*, 4*b* and 4*c* should be put together to give the complete detailed logic block diagram of a preferred embodiment of the system.

FIGURE 4*a* shows a detailed logic block of a part of the preferred embodiment of the system.

Figure 4B:
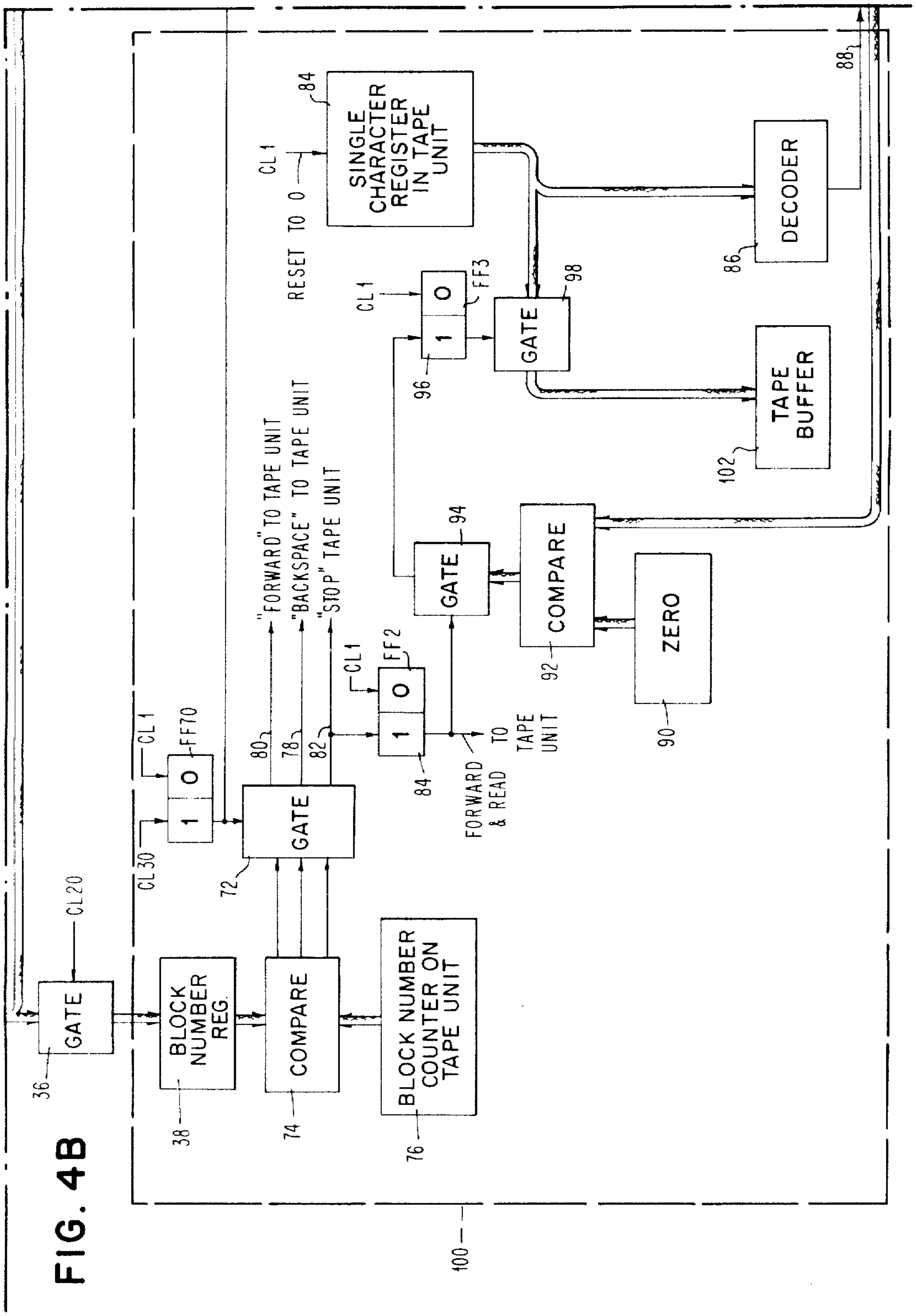

FIGURE 4*b* shows a detailed logic block of a part of the preferred embodiment of the system.

Figure 4C:
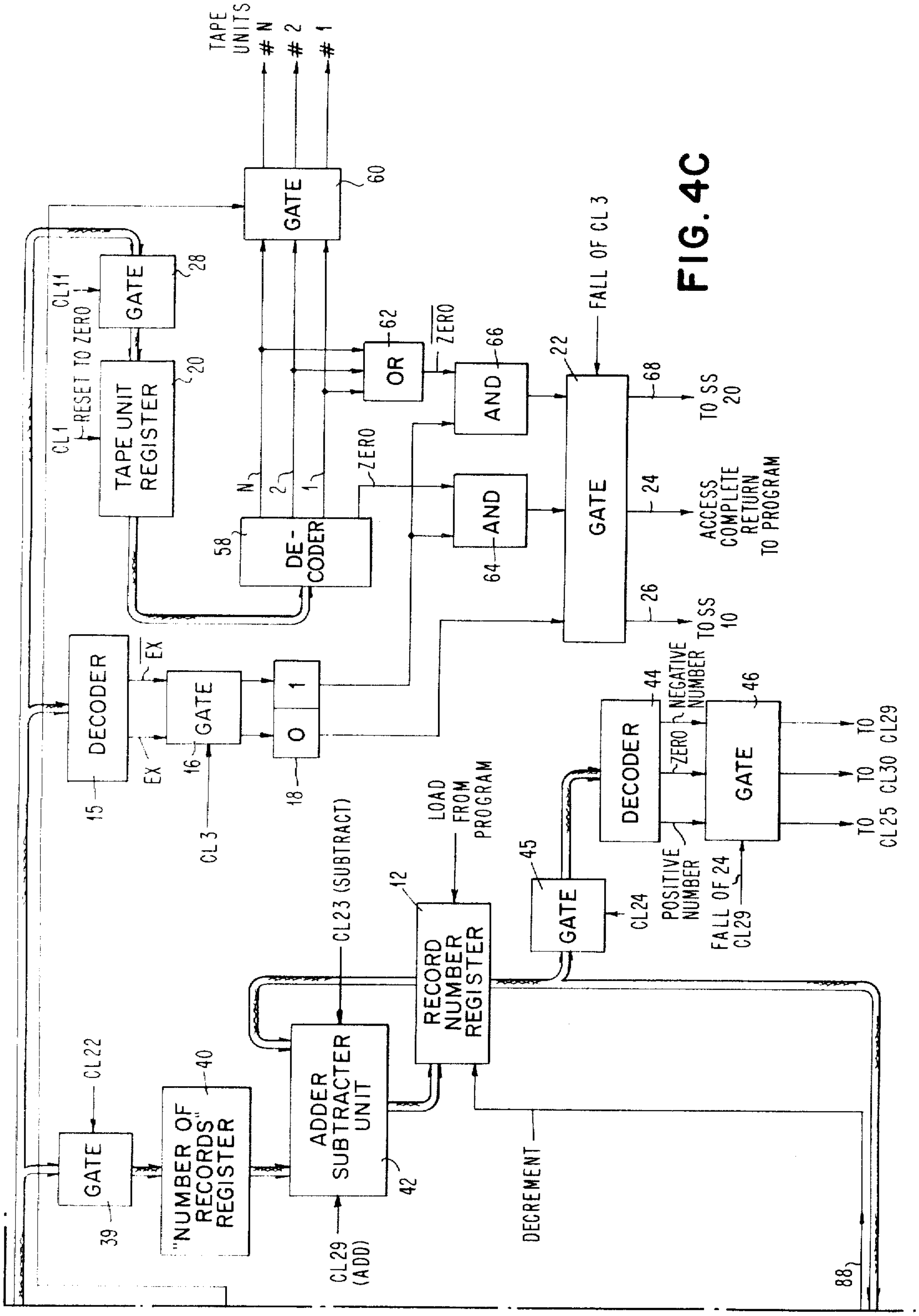

FIGURE 4c shows a detailed logic block of a part of the preferred embodiment of the system.

Figure 5:
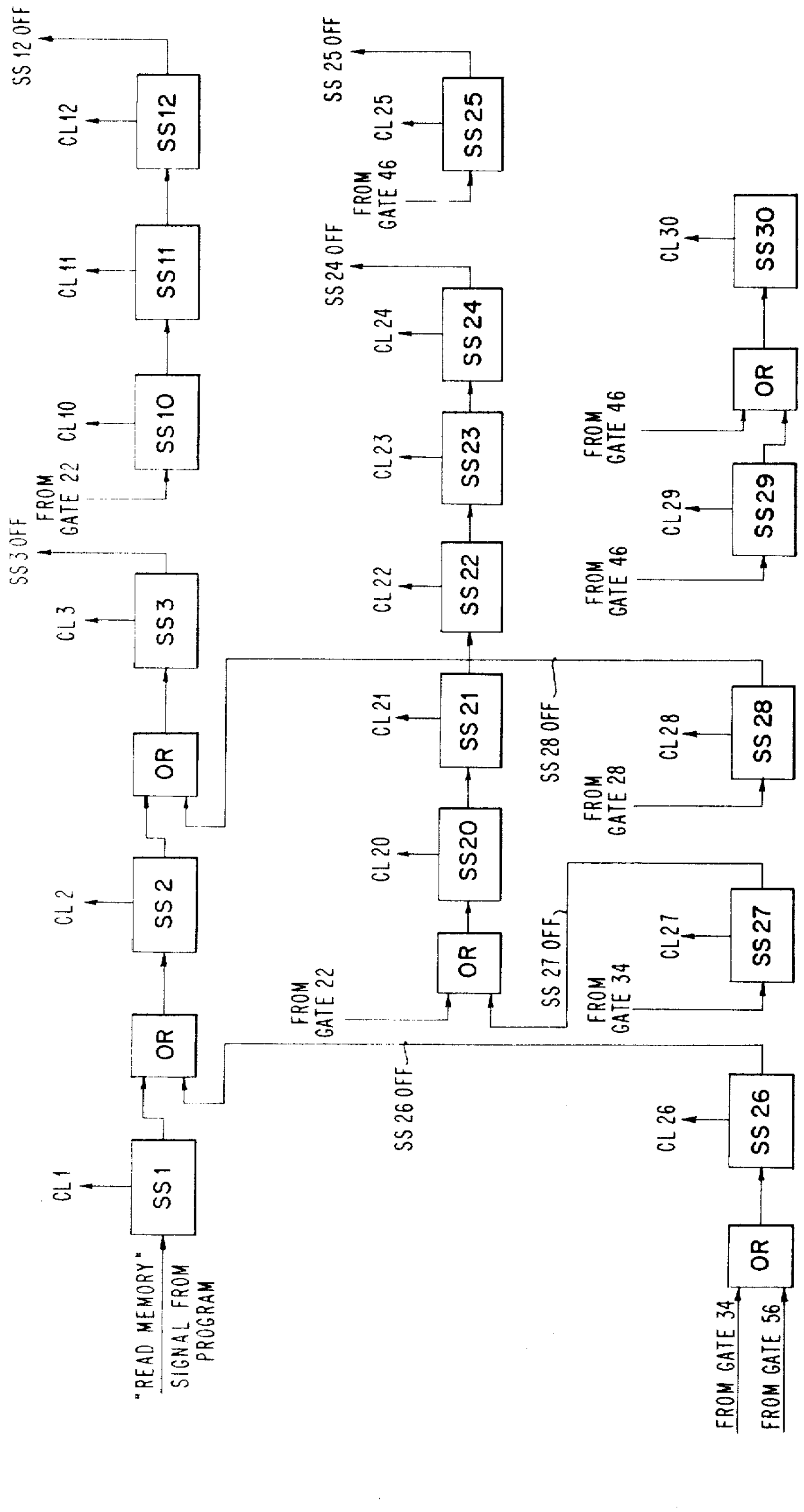

FIGURE 5 is a functional block diagram of the timing circuit required in the logical schematic of FIGURE 4.

The objects of the present invention are accomplished in general by a system for the high speed accessing of large serial memories wherein each memory is comprised of a plurality of large serial storage units. Each unit which might typically comprise a magnetic tape deck contains large quantities of serially stored information therein, the information being organized in first large groups, each of said first groups being separated by a characteristic indicator therein and each of said first groups being composed of a plurality of second groups, each of said second groups similarly being separated by a characteristic indicator. All of the data in these units comprise batches of data, each batch may contain a plurality of said first large groups. A mapping table is provided for said serial memory referring to each batch of named data. The table actually comprises a plurality of lists wherein each list relates to a particular "named" data batch and wherein each list contains a number of entries, each entry identifying a particular first group of data. The identifying portion of each entry includes the number of the large storage unit at which a particular "named" batch of data begins and a list in sequential order of said first large groups in said batch and an indication of the number of second groups within each of said first groups which comprises the complete batch. The system requires a program command for obtaining data from said memory specifying the "name" of the batch of data desired or the address of the first member of the list and the number of second groups from the beginning of said batch where the desired data is located. The system specifically comprises memory means for storing the complete mapping table, means for accessing said table at the beginning of a "named" data list batch address, means for determining if the desired information is located in one of the large storage units and means for accessing the proper large storage unit in accordance with said last named means. Means are further provided for accessing the desired first groups of data from the designated large storage unit and for determining that a desired second group of data is located therein in accordance with the "named" data list. Means are further provided to sequentially count second groups within said desired first group when located until the desired second group is located and to gate the desired second group out of the memory.

From the above, it will be seen that the system requires a formated data arrangement on the tape and further requires special purpose apparatus for accessing the special mapping table and for keeping track of the occurrences of various first and second groups of data in said serial memories. Special hardware in the nature of registers, comparison circuits and a system timing clock are provided to accomplish the accessing of data from such memories in accordance with a preferred embodiment of the present invention as will be more specifically pointed out and explained with reference to the drawings.

In the above broad statement of the invention, the data format was referred to as having large units, first groups within said large units and second groups within said first groups. The usual terminology employed when referring to magnetic tape memories would be as follows. A large unit would be an individual tape deck or tape drive unit. Each of said tapes would be broken up into a plurality of blocks or first groups. And as stated previously, each of said blocks is in turn broken up into a series of smaller units normally referred to as records, which in the above statement refers to said second groups. Throughout the remainder of the specification the terminology, tape unit, block and record will be utilized rather than referring to the units and the groups.

The above accessing procedure involves two distinct operations. The first is the utilization of special "named" data lists in the mapping table to determine the proper serial memory or tape unit and the proper data block on said unit. The second involves actually accessing this tape unit and specified block and then accessing the specified record within said block.

By means of the invention, the system can automatically access a desired record somewhere in a plurality of tape units by merely stating, for example, "locate" the 2050th record in the data batch named "payroll," it being understood that an address in special mapping memory is determinable from the name "payroll."

It is assumed for the purposes of the present invention that the beginning address of any specified "named" data list in the main memory is given in the program. However, there are mapping systems available which will automatically determine such address from the "name" only. One such system is described in copending application Ser. No. 287,364 of A. P. Mullery et al. filed June 12, 1963 and entitled "Symbolic Addressing."

Figure 1:
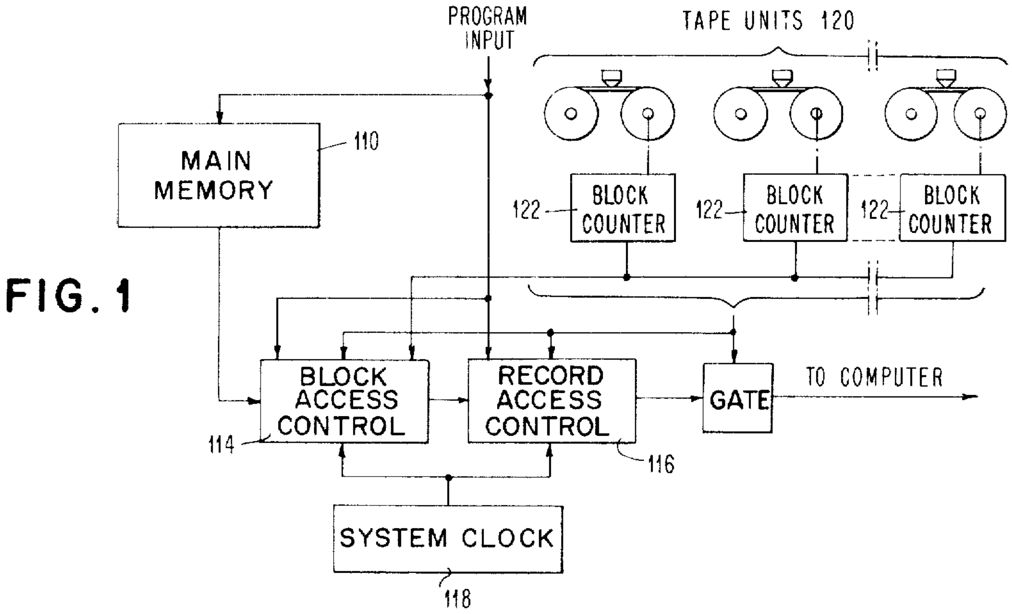
FIGURE 1 is a block diagram illustrating the major functional components of the present system.

Referring now to the drawings, FIGURE 1 is a functional block diagram of the over-all system anticipated by the present invention. The system comprises the following major functional units, the Main Memory 110, the Tape Units 120, the Block and Record Access Controls 114 and 116 and the System Timing Unit or Clock 118. It will also be noted that each of the Tape Units 120 within the System 112 contains an individual Block Counter 122 which is customarily employed on such units and automatically provides an indication of the particular block on which a particular tape unit is sitting at any given instant. It should further be noted that it is conventional practice in the computer art to always stop a tape unit at one of the special block separators, which as will be described subsequently, is normally a predetermined blank space between such blocks. This is so that, upon start up, the tape unit has a certain amount of time to get up to rated speed before it can get to a position where information may be read out. The present system takes advantage of this characteristic as will be explained more fully subsequently to start indexing a particular tape unit in either direction when initiating a search for a particular data record which is being sought.

The Main Memory 110 is a standard three dimensional random access core type memory, complete descriptions of which are available in numerous published articles. Such a memory includes address registers, output buffer registers, driver amplifiers, sense amplifiers and inhibit drivers as well as the necessary timing and control circuits to perform the various writing and reading instructions. The Block Access Control and Record Access Control blocks 114 and 116 will, of course, be described in more detail subsequently, but generally, they function to first locate the desired block in which a particular desired record is stored and subsequently, search within the block for the desired record. The System Clock 118 will likewise be described more generally subsequently but generally, it serves to time the various operations of the system under control of a request from the program and is essentially synchronous in its operation as it contains a series of conventional single shots whose various inputs and outputs are utilized to achieve the timing and testing functions necessary in the system. The system might be considered partly asynchronous, however, inasmuch as it provides for branching at a number of locations in accordance with the type of search that is being made.

Figures 2, 3A, 3B, 3C, 3D:
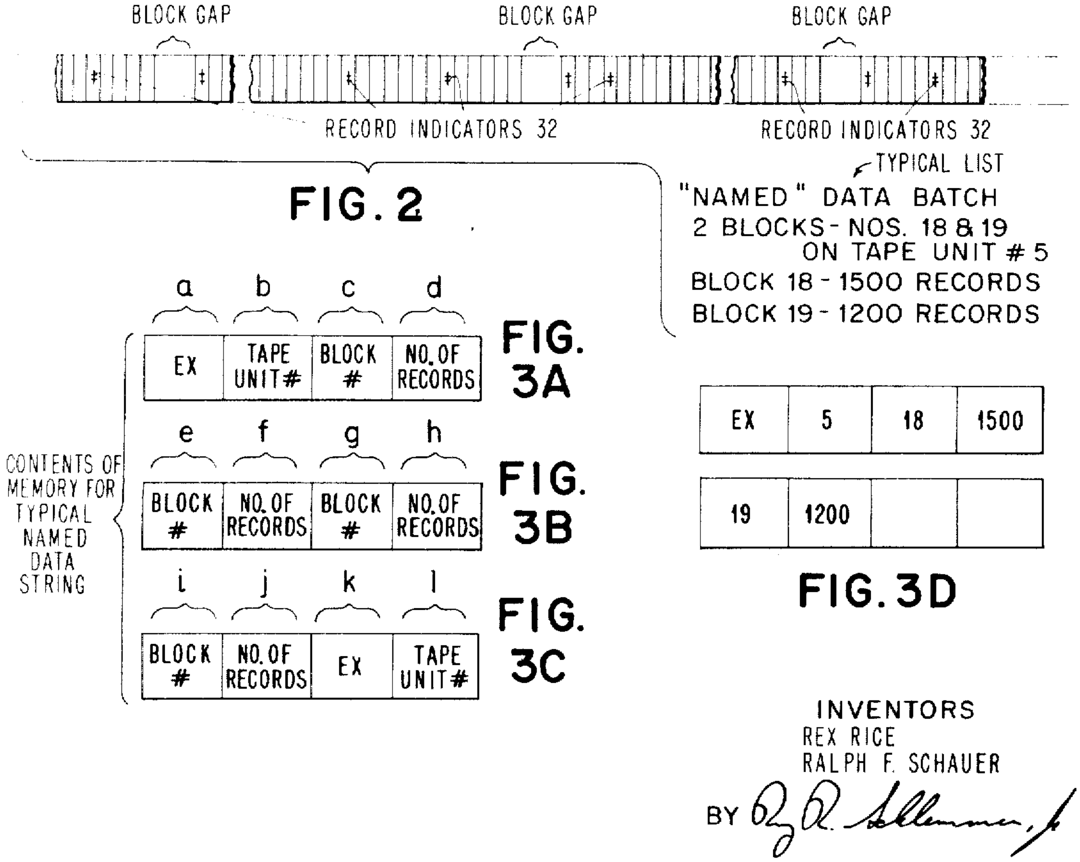
FIGURE 2 is a digrammatic representation of a data tape illustrating the tape format utilized by the present invention.
FIGURES 3A through 3D are diagrammatic illustrations of the structure of a plurality of consecutive memory words in the map memory starting with the first word of a typical list for a particular "named" batch of data.

FIGURE 2 is intended to illustrate the sort of format for storage on a magnetic tape or other similarly readable serial memory necessary with the present invention and illustrates the actual memory structure including the block gaps, record indicators and also the characters themselves. Referring specifically to this figure, it will be noted that there are three block gaps shown. As stated previously, these gaps are conventionally areas in which there is no recorded information or signal in the particular gap area.

The width of said gap can vary rather widely with different systems but would normally be several hundred characters wide. In addition, a plurality of record indicators 32 are shown within each of the two complete blocks. These record indicators may be any desired binary coded character, however, they are shown illustratively in the present drawing by the symbol (‡). In between the various record indicators there are shown a number of small areas, each of which represents a character which would make up the various words, spacers, etc., of the particular records. Only two complete blocks and a relatively small number of records are illustrated in the drawing. However, it is to be understood that there would, of course, be far more blocks and records on any particular tape. This is indicated by the two discontinuities shown in the tape in each of the two complete blocks shown. Representative numbers for a particular "named" data batch list are illustrated in the table in the lower part of the figure where the list is indicated as containing two blocks, said blocks being specified as block Nos. 18 and 19 on the particular Tape Unit. Also, as will be seen, block 1 is indicated as containing 1500 records and block 2 containing 1200 records. As will be apparent, these figures are merely exemplary and almost any random number of blocks and records within a block could make up a particular "named" batch of data. However, from this example, it will be seen that if the "named" data batch were, for example, "payroll," and it were desired to locate this particular data batch on, for example, Tape Unit 5, it would be necessary to specify that the "named" data batch "payroll" began on Tape Unit 5 in block 18 which includes 1500 individual records and also includes block 19 on the same Tape Unit which contains 1200 records. It is the purpose of the present system to be able to take such a tape organized in this manner and find, for example, the 2050th record from the first record of the data batch which is named "payroll."

Referring now to FIGURE 3 which is an example of a machine word which would be stored in the Main Memory 10, the organization and operation of the present system will begin to be more apparent. Referring to FIGURE 3A, there is indicated the first word of the mapping list in the Main Memory 110 for a given "named" data batch. It will be noted that this machine word is broken up into four sections. If it is assumed that each machine word in the Main Memory may have eight characters, each of these sections will, of course, include two characters. A machine word has been considered as having eight characters for the purposes of the present description of the invention inasmuch as this is a standard word length for a majority of three dimensional random access core type memories. It will be apparent to a person skilled in the art that a special memory having considerably less storage capacity per word could be used to store the necessary information to implement the present system. Referring now again to FIGURE 3A which is the format for an illustrative first machine word at any given address location in the mapping table for a given "named" data batch, the first area marked *a* containing the symbol "EX" indicates that the "named" data called for by the program is in external storage, i.e., the serial memory or Tape Units. This provision is made since in a given system there may be a great deal of information which is used continuously and which would be stored in the portion of the Main Memory not devoted to the mapping tables but the location of which it is desired to keep as a specific list as in the present system. In any event, the occurrence of the character "EX" sets the machinery of the present system in operation and indicates that a search of the external serial memory must be made to locate the desired data. The storage area *b* marked "Tape Unit Number" would indicate the particular Tape Unit on which a particular "named" batch of data begins. For the example illustrated in FIGURE 2, this would be Tape Unit No. 5. Area *c* or the block number indicates the first block on the Tape Unit in which the "named" data batch occurs and again as in the present example, this would be block 18. The last area of this particular word *d* contains an indication of the total number of records which are in block 18 and the number 1500, for the example of FIGURE 2, would be stored at this location. Since as in the present case, it is not possible to store or list all of the block numbers for the average data batch in a single machine word, subsequent machine words must be utilized to continue the list. The diagram of FIGURE 3B illustrates the second contiguous machine word in which the list of FIGURE 3A would be continued and in the position *e* thereof, there would be stored a second block number, i.e., 19 in the example of FIGURE 2, and in the area *f* the number of records, i.e., 1200, for the example of FIGURE 2. Actually, this much storage in Main Memory would be all that would be required for the particular example of FIGURE 2, but since many "named" data batches would be far more extensive, provision is made to continue this listing of the data content for a particular batch to any extent necessary. In other words, subsequent block numbers, storage locations and record number areas such as *g* and *h* of FIGURE 3B are included. In FIGURE 3C, however, a different situation arises in which the particular "named" data batch carries over into still another external Tape Unit. This is provided for by again utilizing the symbol "EX" which modifies the system to select another Tape Unit and then continues as in the examples of 3A and 3B. However, it will be noticed that the symbols "EX" and the Tape Unit Number occur in different locations in FIGURES 3C and 3A. The necessary controls for testing in which location the external Tape Unit indication occurs will be described for the particular embodiment of FIGURE 4. The important factor is that there is no essential difference in the operation of the system other than the fact that it must keep track of the particular location in which the "EX" occurs for purposes of control as will be apparent from the subsequent description.

FIGURE 3D illustrates how the example shown in the table of FIGURE 2 would appear in the "named" data batch list such as shown in FIGURES 3A–3C. It will be noted that the symbol "EX" appears in position *a* to denote that this "named" data batch is in external storage. The number 5 appears in position *b* indicating that the first block is on Tape Unit No. 5. The number 18 appears in position *c* indicating the eighteenth block on this tape is the first segment of the data batch and the 1500 in position *d* indicates that there are 1500 records in block 18. Going now to the second machine word, the number 19 appears in position *e* indicating that the 19th block is the second number of the data batch on the tape and the number 1200 appearing in position *f* indicates the number of records in this the last member of the data batch. It will thus be apparent that any number of blocks and tapes may be referred to in like manner depending on how many members there are in the data batch.

A logical schematic diagram of a system embodying the principles of the present invention is disclosed in FIGURE 4. Subsequent sections of the specification will set forth a preferred Sequence Timing Chart for the Control Unit of the System of FIGURE 4 and will also set forth a detailed description of the operation of the system setting forth data flow and tests made illustrating all significant variations of the system function as required by a "named" data list which would be likely to occur in the mapping table. Additionally, there will be described the operation of the system with the specific example illustrated in the table at the bottom of FIGURE 2 and in FIGURE 3D. However, before going into the specific operating details of the system, the purpose or function of the more important functional units of FIGURE 4 will now be set forth.

Referring to FIGURE 4, the Main Memory 11 is illustrated as a functional block and it will be noted that the memory is provided with a Memory Address Register (MAR) 10 and a Data Register 14. It will further be noted that a "read" signal input is indicated as is well known with such memories. Since for the purposes of the present invention it is assumed that the map table or name lists previously described have been pre-stored in the memory, no discussion of the writing of such material in memory will be included herewith since the writing of alphanumeric data into memory is notoriously well known in the computer arts. The "read" operations are the only memory cycle necessary in practicing the present invention. Ring 19 containing four positions is provided for the purpose of gating out the various sections of the memory word, i.e., *a*, *b*, *c* and *d* of FIGURE 3A described previously. Decoder 15 and gate 16 tests whether or not a particular storage area of one of the "named" data list words contains an "EX" indicator and if so, sets the flip-flop 18 to a "1" or a "0" which is utilized in subsequent control steps to branch into various control routines of the system. Tape Unit Register 20 (TUR) together with Decoder 58 determines which Tape Unit is being called for by the data list in the mapping table in Main Memory and provides a signal through gate 60 which activates the called for Tape Unit and places it on the line for subsequent searching.

The Number of Records Register 40, the Adder-Subtractor block 42 and Record Number Register 12 perform the function of comparing sequentially the number of records in a particular block of the "named" data list with the desired record number loaded into Register 12 from the program to determine whether or not it is necessary to go forward with the search into the next block of data, i.e., determines whether a particular block contains the desired record or whether the system must access to the next indicated block in the "named" data list.

Block Number Register 38, Compare Register 74 and Block Number Counter 76 determine whether or not the Tape Unit is currently sitting on the specified block number in the particular portion of the "named" data list being currently investigated. If the circuitry determines that the incorrect block number is stored in Block Number Counter Register 76, the Tape Unit will automatically be given the proper instruction to go "forward" or "reverse" until the proper number is found.

Record Number Register 12, Compare Circuit 92 and Zero Character Register 90 are utilized to determine when the desired record number is actually found and its output will tell the system to gate this record from the Tape Unit into the Main Memory. Single Character Register 85 and Decoder 86 are used to scan the tape during a high speed sweep and detects the occurrences of record symbols and provides suitable pulses to increment the Record Number Register 12 as will be explained more fully subsequently.

Referring to the composite drawing of FIGURE 4, it will be noted that a dashed line 100 passes through this figure. It may be stated that, that portion of the logical circuitry above the line performs the function of determining whether or not called for information is in external storage, places the proper Tape Unit on the line and then determines in which block of data within a given "named" data batch the particular desired record is located. Having determined the proper block number, which number is entered into the Block Number Register 38, the portion of the circuitry below the line 100 performs the function of locating the proper block on the actual Tape Unit and then having located this block, proceeds with a search therethrough until the proper or desired record is found. It should be noted that the Record Number Register 12 actually performs a dual function in that it performs an important function in the step of block location and also in the step of ultimately detecting the specific record desired.

It will be noted that one Clock Pulse 30 (which will be described subsequently) is initiated, the operation of this system, i.e., that portion below line 100, becomes fully synchronous or self-controlled by the logic shown in the diagram. In other words, once the proper block number is entered in Block Number Register 38, Clock Pulse 30 sets the flip-flop 70 to a "1." The Tape Unit is controlled in accordance with the output of the Compare Register 74 and depending upon whether the number in the Block Number Counter 76 on the Tape Unit is greater or less than the number stored in Block Number Register 38, a signal will go out on lines 78 or 80 to "backspace" or go "forward" respectively. It will be understood that these commands, i.e., "forward" or "backspace," will continue operation of the Tape Unit until an equal signal on line 82 occurs, at which point the Tape Unit will be stopped and flip-flop 2 set to a "1." The setting of flip-flop 2 will then initiate gate 94 which through operations to be explained subsequently, the specific record number is subsequently found.

A specific example of a simple search procedure based on the simple data batch indicated in FIGURE 2 will be explained subsequent to the following detailed description of the timing circuitry and the logical schematic diagram.

Before proceeding with the detailed description of the logical circuit diagram of the composite FIGURE 4, reference should be made to the following Timing Sequence Chart wherein all of the operations occurring in each Clock Step, together with indications of branching are indicated. This Timing Chart in and of itself should suffice to clearly indicate the mode of operation of the present system.

TIMING SEQUENCE CHART

LOAD FROM PROGRAM:
- (1) Starting address of "named" data list in Main Memory.
- (2) Number of desired record into Record Number Register 12.
- (3) Initiate "Read Memory Cycle, i.e., go to S.S. 1.

Clock Step 1:
- Set Tape Unit Register to zero.
- Set Data Register Ring 19 to one.
- Reset F.F. 70 to "0."
- Reset F.F. 2 to "0."
- Reset F.F. 3 to "0."
- Go to S.S. 2.

Clock Step 2:
- "Read Memory" Instruction.
- Go to S.S. 3.

Clock Step 3:
- Test for occurrence of "EX."
- If "$\overline{\text{EX}}$" and Tape Unit Register 20 set to zero, this indicates "access" complete.
- If "EX" go to Tape Unit Routine, i.e., to S.S. 10.
- If "$\overline{\text{EX}}$" and Tape Unit Register 20 on $\overline{\text{zero}}$ go to Block Routine, i.e., S.S. 20.

(This is a branching point)

TAPE UNIT ROUTINE

Clock Step 10:
- Increment Ring 19.
- Go to S.S. 11.

Clock Step 11:
- Gate Tape Unit Number from Data Register 14 to Tape Unit Register 20.
- Go to S.S. 12.

Clock Step 12:
- Test position of Ring 19.
- If on position number 2 go to S.S. 27.
- If on position number 4 go to S.S. 26.

(This is a branching point)

BLOCK ROUTINE

Clock Step 20:
- Gate block number from Data Register 14 to Block Number Register 38.
- Go to S.S. 21.

Clock Step 21:
Increment Ring 19.
Go to S.S. 22.
Clock Step 22:
Gate number of records from Data Register 14 to Number of Records Register 40.
Go to S.S. 23.
Clock Step 23:
Subtract contents of Number of Records Register 40 from Record Number Register 12.
Enter result back into Record Number Register 12.
Go to S.S. 24.
Clock Step 24:
Test Record Number Register 12.
If zero go to S.S. 30.
If greater than zero (positive) go to S.S. 25.
If negative go to S.S. 29.
(This is a branching point)
Clock Step 25:
Test position of Ring 19.
If on position number 2 go to S.S. 28.
If on position number 4 go to S.S. 26.
(This is a branching point)
Clock Step 26:
Reset Ring 19 to one.
Increment MAR 10.
Go to S.S. 2.
Clock Step 27:
Increment Ring 19.
Go to S.S. 20.
Clock Step 28:
Increment Ring 19.
Go to S.S. 3.
Clock Step 29:
Add contents of Number of Records Register 40 to Record Number Register 12.
Transfer result back into Record Number Register 12.
On "turn off" of S.S. 29 go to S.S. 30.
Clock Step 30:
Compare contents of Block Number Counter 76 with contents of Block Number Register 38.
If equal set F.F. 2 to a "1" which sends a "forward and read" command to the Tape Unit.
If Block Number Counter 76 is greater, said command to Tape Unit to "backspace" until "equal."
If Block Number Counter is less, send command to Tape Unit to go "forward" until "equal."

The above Timing Sequence Chart shows in detail all of the steps involved in practicing the present invention. The Clock or Timing Control Circuit shown in FIGURE 5 is the apparatus utilized for timing the system shown in FIGURE 4. The operative units comprising this Clock are simple single shot multivibrators, which when turned on produce a pulse at the turn on time and a short time subsequent thereto produce a second or turn off pulse. Such multivibrators are very well known in the art and any multivibrator meeting the above criteria may be used for the individual Clock Steps or single shots disclosed in the embodiment of FIGURE 5. It will be noted that all of the interconnections shown in FIGURE 5 follow exactly the Timing Sequence Chart above. The system clock diagram does not show the controls for the decision making circuitry which performs the branching since this is accomplished by other logic circuitry disclosed in FIGURE 4. The usual type of circuitry involved in making a two input decision as disclosed in the embodiment of FIGURE 4 comprises a flip-flop settable to one of two states dependent on which of two conditions arises and subsequent circuitry for reading the state of said flip-flop and branching in one of two directions. This circuitry will be apparent from an examination of FIGURE 4 and also from the subsequent description of the operation of the circuitry of FIGURE 4.

Referring now specifically to FIGURE 4, as stated previously, all of the blocks disclosed therein comprise completely conventional computer circuitry including the Main Memory controls, the Ring Circuit 19, the many registers, decoders, gate circuits, OR circuits, AND circuits and the Adder-Subtractor Unit 42. Any one of these blocks may be found in a number of different reference texts such as "Arithmetic Operations in Digital Computers" by R. K. Richards, 1955, D. Van Nostrand Co., New York and "Digital Computer Components and Circuits" by R. K. Richards, 1957, D. Van Nostrand Co., New York.

The following is a detailed description of the sequence of operations of the logical schematic diagram of the composite FIGURE 4.

As indicated in the Timing Sequence Chart to initiate a search in the present system there must be a program command to fetch data from memory together with an indication of the "named" data batch in which the desired information is located and also, the number of the record within this "named" data batch which is the specific record desired must be provided and ultimately loaded in the Record Number Register 12. As stated previously, the address of the first word of the "named" data batch list is obtained and then input to the Memory Address Register 10. It will be remembered that the lists of addresses for all of the "named" data batches are stored in the Main Memory 11 which has been referred to previously as the mapping table. The signal from the program which actually initiates a "memory access" cycle is a pulse applied to Clock Stage 1 or S.S. 1 in FIGURE 5.

Clock Pulse 1 resets the various flip-flops 2, 3 and 70 to a "0." It further resets the Ring 19 to its one position and sets the Tape Unit Register 20 to zero. The fall of S.S. 1 then starts S.S. 2 which is applied to the Main Memory as a "read access" signal. Thus, by the end of time 2, the memory word whose address was inserted in the Memory Address Register 10 will appear in the Data Register 14. This first word of any "named" data list will be an 8 character memory word of the type illustrated in FIGURE 3A wherein the two left hand characters are used for the special character "EX" which indicates that the requested information is in external storage. As stated previously, if this combination of symbols indicating external store is not present in the first two characters of this first memory word, then the data which the program desires is already in the core memory and no further action is taken by the present system to obtain further data relative to the location in external or tape storage. Similarly, if the first two characters do indicate external storage, then the next two characters indicate the number of the Tape Unit where the start of the data occurs. The fifth and sixth characters are utilized to store the number of the block on the Tape Unit where the "named" data starts and the next two characters in this memory word, i.e., the seventh and eighth, are used to store the number of records contained in this block. As stated previously, this data list may extend through more than one Tape Unit as indicated in FIGURES 3B and 3C. It will be noted, however, that the block number only appears in the first and second or the fifth and sixth character locations of the machine word and similarly, the external storage indicator "EX" can only be located in these same character positions. Similarly, the "number of records" indicator always appears in either the third and fourth or seventh and eighth character locations of a memory word as does the Tape Unit Number.

It will be further remembered that in such a list, it may be necessary to shift to an additional Tape Unit if the particular batch of data extends thereto. In this case, as indicated in FIGURE 3C, a symbol "EX" will appear in either the position "*i*" or "*k*" followed by the number of the Tape Unit in the next position. By sensing the existence or non-existence of an "EX" symbol in the first and second or fifth and sixth character positions in the various stages of the process, the system will automatically switch to an additional Tape Unit whenever the "named" data list indicates the necessity of doing so.

The turning off of S.S. 2 initiates S.S. 3 which tests the memory word in the Data Register 14 for the existence of the symbol "EX" in the first and second character positions. Since the Ring 19 is in the first position, gate 13 is enabled, thus gating the information from the first and second character positions of the word in Data Register 14 through OR circuit 17 to Decoder 15. Gate 16 is enabled by Clock Pulse 3. If the "EX" is present, flip-flop 18 is set to "0" and if the "EX" is not present, it will be set to "1."

At this point, the output of the Decoder 15 is combined with the contents of the Tape Unit Register 20 to determine what branch of operation the system is to take. If "EX" is not present and the Tape Unit Register is on zero, which, of course, means that no Tape Unit Number has been inserted in the Tape Unit Register 20, then it will be noted that on the turn off of S.S. 3, the gate circuit 22 will cause line 24 to be active. If line 24 is active, it means that the access is complete and that the information requested is in the core memory and that there is no need to go to the external storage units, and therefore, the machine will revert to its program and extract the desired data from Main Memory such as the above referenced copending application of A.P. Mullery et al. If the "EX" is present and the Tape Unit Register is on zero, it means that the system has encountered the first Tape Unit specified in the "named" data list which contains the desired data. If this situation occurs, it will be noted that the program goes to Clock Step 10 as indicated in the logical schematic diagram of FIGURE 5.

Upon the branch of the machine instructions to Clock 10, the Ring 19 is incremented by one and upon turn off of the S.S. 10, Clock Step 11 is initiated. On Clock Step 11, the Tape Unit Number stored in position *b* of the Data Register (see FIGURE 3A) is gated from the Data Register 14 to the Tape Unit Register 20 through gate 28. The positions 3 and 4 of the Data Register were gated through OR circuit 17 because gate 21 had been opened by the activation of the second position of Ring 19 due to its previous incrementing. It is now necessary to test the Ring 19 to determine whether the second or fourth position thereof is actuated. This is to increment the Memory Address Register 10 if necessary to retrieve the next machine word for the "named" data list in order that the subsequent block numbers and number of records information may be obtained therefrom to proceed with the accessing operation as will be apparent from the subsequent description. In the example of FIGURE 3A, the Ring would currently be sitting on the number 2 position so the actuation of S.S. 12 causes gate 30 to set flip-flop 32 to a "1." The turn off of S.S. 12 in turn gates the active line of the flip-flop 32 through gate 34 to, in this instance, initiate Clock Cycle 27. If the Ring 19 had been in position 4, flip-flop 32 would, of course, have been in its "0" state and Clock Cycle 26 would have been actuated. However, since the list structure exemplified in FIGURES 3A–3C is being utilized for purposes of the present detailed description, it will be assumed that Clock Cycle 27 is next in the sequence of operations.

S.S. 27 causes the Ring 19 to be incremented again and its turn off initiates S.S. 20. The reason for the incrementing of the Ring 19 is that the next number to be read out of the Data Register 14 will be the block number. Clock Pulse 20 is applied to gate 36 and gates a block number in the fifth and sixth character positions, i.e., position *c* of FIGURE 3A into the Block Number Register 38. Again, it is the fifth and sixth character positions of the Data Register 14 which are read on this cycle because gate circuit 37 was actuated by the current sitting of the Ring 19 on position 3. A turn off of S.S. 20 initiates Clock Cycle 21. Clock Pulse 21 again increments the Ring 19 and on turning off, goes to Clock Cycle 22. Clock Pulse 22 causes the number of records present in the seventh and eighth character positions of the machine word in Data Register 14 to be gated through gate circuit 39 to the Number of Records Register 40. The turn off of S.S. 22 initiates Clock Cycle 23. Clock Pulse 23 causes the Adder-Subtractor Unit 42 to subtract the contents of the Number of Records Register 40 from the contents of the Record Number Register 12 which it will be remembered was loaded from the program. It will be noted that Clock Pulse 23 specifically calls for a subtraction which causes the proper operands to be gated from Registers 40 and 12 into the Unit and then automatically gates the result back into the Record Number Register 12. By this operation, the number in the Record Number Register 12 is decremented by an amount equal to the number of records in the first block. The turn off of S.S. 23 initiates Clock Cycle 24.

At this point, the contents of Record Number Register 12 are tested to see if the number contained therein is a zero, a negative number or a positive number. It will be noted that the Record Number Register 12 is connected to the Decoder 44 through gate 45 which is activated by the turn on of S.S. 24. The Decoder 44 has three outputs, the first of which indicates a positive number greater than zero, the second which indicates a zero and the third which indicates a negative number. The fall of S.S. 24 causes the circuit to branch to Clock Step 25, Clock Step 30 or Clock Step 29 depending on which of the above three conditions applies.

If the output of the Decoder indicates a positive number greater than zero, Clock Cycle 25 is initiated which, in essence, acts to gate the next block number and number of records from the "named" data list.

Clock Step 30 indicates that the system has determined which block the desired record is located in and that this block number has been gated into the Block Number Register 38. The initiation of Clock Step 30 causes the Tape Unit to advance to this proper block number and then causes the subsequent circuitry to actually locate the desired record within this block. The occurrence of a zero out of the Decoder 44 would mean that the desired record were actually the first one in the particular block being processed, therefore, only the proper block would have to be found on the Tape Unit, at which point a "compare" signal would come out of Compare Unit 92 and cause the information to be immediately gated out of the Tape Unit into the Tape Buffer 102.

The occurrence of a negative number from Decoder 44 indicates that the desired record is actually located in the block number which is currently being processed by the system. However, this negative number is, in effect, a complement of the desired record, therefore, it is necessary to add the contents of the Record Number Register, i.e., the negative number, to the contents of the Number of Records Register. This step, in effect, replaces the previous number before the last subtraction into the Record Number Register. On the fall of S.S. 29, Clock Cycle 30 may be initiated. If it is assumed that the block number desired has still not been found, a positive number appears out of the Decoder 44 initiating Clock Cycle 25. S.S. 25 again tests the position of the Ring 19 to see if it is on position 2 or 4. It will be noted that lines extend from positions 2 and 4 through gate circuit 52 and when Clock Pulse 25 is applied to this gate, one or the other of these two lines will set the flip-flop 54 to a "1" or a '0' and the output of the flip-flop is gated by the fall of S.S. 25 to actuate either Clock Cycle 28 or 26. Continuing with the example of FIGURE 3A, the position of the Ring would be 4 which would cause Clock Step 26 to be actuated. This condition means that it is necessary to get the next word out of memory and accordingly, S.S. 26 resets the Ring 19 to one, increments the Memory Address Register 10 by one so that the next sequential word therein may be accessed and placed in Data Register 14 and finally, returns to Clock Cycle 2. In Clock Cycle 2, the memory is again read and the contents placed in Data Register 14. The program then advances to Clock Cycle 3 and the first two characters are tested for the presence of "EX." In this particular example, i.e., FIGURE 3B, it is noted that "EX" is not present and that the Tape Unit Register is not on zero. As stated previously, this test is made through Decoder 15, gate 16, flip-flop 18 and AND circuit 66. The occurrence of this condition causes Clock Cycle 20 to be actuated upon the turn off of S.S. 3.

S.S. 20 again causes the block number to be read out, followed by the number of records and following this, the Number of Records Register 40 will be subtracted from the Record Number Register 12 and the contents of the Record Number Register will again be tested.

For the purpose of the present example, it will be assumed that the test of the Record Number Register 12 indicates that it contains a negative number. As stated previously, this means that the Decoder 44 has its right most output line, i.e., negative number, activated upon the fall of S.S. 24 which causes Clock Step 29 to be initiated. Clock Step 29 then proceeds to add the negative number in the Record Number Register to the positive number in the Number of Records Register 40, thus, replacing the original positive number in the Record Number Register 12. The turn off of S.S. 29 then initiates Clock Cycle 30. Clock Pulse 30 sets flip-flop 70 to its "1" state.

It will be noted that the setting of flip-flop 70 to "1" causes two events to occur. First, it gates the proper Tape Unit Number and places the desired Tape Unit on the system line and also enables the gate circuit 72 so that the output of Compare Circuit 74 may be gated out for proper control of the selected Tape Unit.

The Compare Unit 74 has as its one input, the Block Number Register 38 which contains the block number last obtained from the "named" data list in the Main Memory. The other input to the Compare Circuit 74 is the Block Number Counter 76 which is actually located on the Tape Unit.

It should be noted that standard Tape Units will normally read out blocks upon command and will always stop in the middle of a block indicator or block gap. It is significant that by the system of the present invention, the system will access the desired block number beginning with any position on which that particular unit is currently sitting. Thus, it will advance the Tape Unit in either the "forward" or "reverse" direction in accordance with the block number desired as indicated in Block Number Register 38.

If the number in the Block Counter 76 is greater than the number in the Block Number Register 38, it is obvious that the Tape Unit is presently setting on a block further along the tape than that desired. Accordingly, a "backspace" or "reverse" direction signal will be given to the Tape Unit on line 78 from gate circuit 72 which will cause the Tape Unit to backspace until the two numbers are equal, at which point a "stop" command will be given to the Tape Unit and flip-flop 2 will be set to its "1" position. If on the other hand the number in the Block Number Counter 76 is less than the number in the Block Number Register 38, it is necessary to advance the Tape Unit and accordingly, a command will go out on line 80 to advance the Tape Unit until the two numbers are equal, again stopping the Tape Unit and setting flip-flop 2 to its "1" position. The setting of flip-flop 2 to its "1" position indicates to the Tape Unit that it should move "forward" and "read."

It is now necessary to read the record symbols as they appear on the Tape Unit. Every symbol passing the read head of the Tape Unit appears momentarily in the Single Character Register 84 and this is decoded by the Decoder 86 which is set to recognize a record symbol. Every time such a record symbol appears, an output pulse appears on line 88 for the Decoder 86 which serves to decrement the quantity in the Record Number Register 12 by one. It will be remembered that this Register 12 contains a positive number equal to the relative location of the desired record in the particular block being currently accessed. As soon as enough record symbols are recognized to decrement the Record Number Register 12 to zero, a comparison signal will occur from the Comparison Circuit 92 which will be gated to flip-flop 3 through gate circuit 94 which was in turn actuated by the setting of flip-flop 2 to a "1." It will be noted that Zero Register 90 contains a binary "0" stored therein for purposes of comparison with the number in the Record Number Register 12. When flip-flop 3 is set to its "1" state, it enables gate 98 and maintains this gate open so that all characters in the Tape Unit appearing in the Single Character Register 84 will automatically be gated into the Tape Buffer 102. The read out of the information from the tape starting with the desired record number will normally be controlled by the program to continue either until the end of the record or until the end of the then current block, at which point it will automatically stop and some new instruction in the program will be obtained.

The above discussion describes virtually every situation that would occur in the present system with the exception of a continuation of a data onto a second Tape Unit. In this event, an additional "EX" symbol would occur in either the first and second or fifth and sixth character positions of one of the machine words stored in the Data Register 14. If the "EX" symbol appears in the first and second characters and the Tape Unit Register 20 contains some number other than zero which would be the situation when previous members of the "named" data list had been accessed and processed, then the following operations will occur. If the "EX" is present, it does not actually matter whether the Tape Unit Register 20 is on zero or not because the setting of the flip-flop 18 to "0" automatically gates the system to Clock Cycle 10. As explained previously, Clock Cycles 10, 11 and 12 constitute the "Tape Unit Routine" which obtains the proper desired Tape Unit Number, places it in the Tape Unit Register and tests the position of the Ring 19 to see if it is then necessary to gate an additional word out of Main Memory or not in order to get the next block number and number of records. For the present discussion, it is being assumed that the Ring is on position 2, therefore, the routine branches to Clock Cycle 27 which merely increments the Ring 19 and goes directly to the "Block Routine" beginning with Clock Step 20.

If the "EX" had appeared in the fifth and sixth positions of the memory word, the results of Clock Step 12 would have branched the system to Clock Cycle 26. This Cycle it will be remembered resets Ring 19 to one, increments the Memory Address Register 10 by one and then reverts back to Clock Cycle 2. Clock Cycles 2 and 3 read read the memory word from the new address into the Data Register 14 and on the fall of S.S. 3, branches to Clock Cycle 20 which proceeds with a "Block Routine."

It is believed that the above detailed description of the system of FIGURE 4 clearly illustrates and explains the operation of the present system under all possible conditions and has explained what happens in the event of any of the possible branches of instructions which have been explained. The following brief example of a search performed in accordance with the numerical example shown in FIGURE 3D is presented to explain in a numerical manner the general operating characteristics of the device. It will be noted that all of the individual Clock Steps will not be enumerated but rather, the general functions of the machine which are necessary to perform the various steps as it is believed that the specific operating details will be apparent to a person skilled in the art.

EXAMPLE

Referring now to FIGURE 3D, it will be seen that there are two machine words containing the "named" data list for a particular data batch which for purposes of this example will be called "payroll." It will be assumed that the starting address for the first word is given in the program or could be derived by a system such as that disclosed in the above referenced copending application Ser. No. 287,364 of A. P. Mullery et al. It will be assumed that this address, for example is 1048. Further, it is assumed that the program calls for the 2050th record in this particular batch of data. Accordingly, the address 1048 which is the address of the first word in the data batch list for the data named "payroll," is loaded into the Memory Address Register 10 and that the record number 2050 is loaded into the Record Number Register 12 and a "start" or "access memory" signal is supplied to the system in the nature of a pulse to initiate S S. 1.

Referring now to the FIGURE 3D, it will be noted that the symbol "EX" appears in the first and second character positions, i.e., position *a* and that the Tape Unit Indicator 5 appears in position B. It will further be noted that the data batch contains two complete blocks, the first block 18 containing 1500 records and the second, block 19, containing 1200 records.

Referring now to the operation of this system, with the first word stored in the Data Register 14, the system looks at position *a* and determines that it is an "EX" symbol which automatically initiates a Tape Unit Routine. At this point, the number 5 is brought out of the Data Register 14 and stored in the Tape Unit Register, at which point the system accesses the block 18 and subsequently, the number of records 1500 from position *d*. It will be noted that the number of the block 18 is transferred into the Block Number Register 38 and the number of records indicator 1500 is transferred into the Number of Records Register 40. By operations which were explained above, the number 1500 is subtracted from the number 2050 and the result 550 is obviously positive which will cause the system to branch back to Clock Cycle 25 which reinitiates a new "Block Routine." Since the last number of records was obtained from the fourth position of the machine word in Data Register 14, the system causes the second word of the particular "named" data list which as stated previously would be stored in position 1049 to be accessed from memory and in turn gated into the Data Register 14. The system now tests again for the occurrence of an "EX" and finding none, proceeds with the "Block Routine" which causes the number 19 to replace the number 18 currently in the Block Number Register 38. Secondly, the number 1200 is transferred into the Number of Records Register 40 and upon the subtraction routine of Clock Cycle 23, it is determined that a negative number, i.e., minus (−) 650 is now present in the Record Number Register 12 causing Clock Cycle 29 to occur. It will be remembered that Clock Cycle 29 *adds* the negative number, i.e., minus 650 to the number currently in the Number of Records Register, i.e., 1200, which would again place a positive number 550 in the Record Number Register 12. At this point, with the block number 19 stored in Block Number Register 38 and the record number 550 stored in Record Number Register 12, Clock Step 30 is initiated which causes the actual accessing of data on the Tape Unit. Assuming that Tape Unit 5 was currently sitting on block 23, the occurrence of the negative number 4 (by comparison of 23 and 19) would cause a "backspace" command to go to the Tape Unit, at which point the Tape Unit would backspace four blocks until the number 19 appeared in the Block Number Counter 76. At this point, the Tape Unit would be stopped and the flip-flop 2 set to a "1" which again causes the Tape Unit to move but this time in the forward direction and starting at the beginning of block 19 on he Tape Unit. The Single Character Register 84 and Decoder 86 scan the block for record mark occurrences and decrement the number 550 stored in the Record Number Register until this Register is ultimately decremented to zero, at which point the system will be at the beginning of the 550th record in block 19. At this point, flip-flop 3 is set to a "1" and the 550th record in block 19 is gated out to the Tape Buffer 102 in a conventional manner.

It will be noted from the above description of the invention and the examples that any number of blocks in any number Tape Units may make up a list of "named" data. Once in an indicated Unit, any number or order of blocks may appear. The only requirement is that each block number must have the correct number of records contained therein in the adjacent character positions of the machine word. It is, of course, assumed that the list itself be properly assembled and stored in proper sequence.

With the above specific description of the invention, it is believed that the operation of the system should be apparent to anyone skilled in the computer arts. As stated previously, while a specific embodiment capable of performing the operations required has been set forth in the figure, it is anticipated that a number of modifications could be made without departing from the spirit and scope of the invention. For example, the particular Clock Cycle could in all likelihood be varied somewhat and still obtain essentially the same results and similarly, different configurations of hardware other than those shown may be selected to obtain the various data transfers and tests. For example, when testing for the occurrence or setting of the Ring 19 in the second or fourth position, it will be noted that two gate circuits and a flip-flop are utilized for simplicity of timing, i.e., to avoid criticalities in the timing circuits. However, it will be apparent that one gate and the flip-flop could be dispensed with and the output taken directly through a single gate on, for example, the fall of S.S. 25. This latter arrangement is apparent in the output of the Decoder 44 wherein this output is gated directly to Clock Stages 25, 29 or 30.

The present system has been specifically explained with reference to a plurality of tape decks or Tape Units as the type of serial memory intended, however, it will be understood that an almost identical arrangement may be used with any other well known type of serial memory such as magnetic wire, film, disc, paper tape or equivalent systems.

As a further example, a multiple magnetic disc file could easily replace the tape file. In such a system a disc would replace the large storage unit and tracks or groups of tracks would replace blocks. Individual tracks would then contain groups of records. The present system would be particularly useful with a disc file having only one access arm for the entire file or one head per disc. The system for such a disc file would operate in about the identical manner as for the previously described tape system. Instead of a tape unit number, a disc number would be given and instead of a block number, a track number would be specified. It will thus be apparent that the present system may be readily adapted to a wide variety of serial memories with a minimum of modification.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for the high speed accessing of large serial memories wherein each memory is comprised of a plurality of large serial storage units, each unit comprising a first hierarchical level data group of said memory, each said first hierarchical level data group being comprised of a plurality of second hierarchical level data groups and each of said second hierarchical level data groups being further comprised of a plurality of third hierarchical level data groups wherein all of said hierarchical level data groups are separated by characteristic indicators, all data in said system being organized in batches, each batch containing at least one of said second hierarchical level data groups, means for storing a data list for each batch of data, said list comprising an identification of all of the second hierarchical level data groups in said batch occurring in proper sequential order, wherein said list includes an indication of the first hierarchical level data group in which each of said second hierarchical level data groups is located and an indication of the number of third hierarchical level data groups which each of said second hierarchical level data groups contains, program means for specifying a desired third hierarchical level data group and its relative location from the beginning of a specified batch of data which group it is desired to retrieve, means for sequentially retrieving the list of data from said storage means for the indicated data batch in which the desired data group is located, means for sequentially acccessing the members of a desired data list from said storage means, means for first determining from said list if said requested data is located in said large serial memory, means for determining in which of said first hierarchical level data groups each specified second hierarchical level data group is located, means for comparing the contents of successive second hierarchical level data groups of said list against the relative location of said requested third hierarchical level data group until the desired second hierarchical level data group in which the requested third hierarchical data group is located is found, means for selecting the desired first hierarchical level data group in accordance with the list indication for the desired second hierarchical level data group, means for accessing the beginning of said desired second hierarchical level data group, means for accessing the particular requested third hierarchical level data group within said second hierarchical level data group and means for gating said third hierarchial level data group from said memory.

2. A system as set forth in claim 1 wherein said last named means comprises counting means for counting each third hierarchical level data group as said second hierarchical level data group is scanned starting at the beginning thereof.

3. A system as set forth in claim 1 including means for first determining whether a requested segment of data is, in effect, stored in said large serial memory, said last named means including means for examining an assigned portion of each member of said stored data list for a characteristic symbol indicative of the occurrence of the desired data in said serial memory.

4. A system as set forth in claim 1 including means for determining if sequential second hierarchical level data groups of said data list occur within previously specified first hierarchical level data groups and means for automatically transferring system control from a first such indicated first hierarchical level to other indicated first hierarchical levels.

5. A system as set forth in claim 1 above wherein the means for determining whether or not a requested third hierarchical level of data within a given batch of data is located within a particular second hierarchical data level comprises means for sequentially subtracting the total number of third hierarchical levels of data in successive indicated second hierarchical level data groups of the data list from the number requested by the system program and means responsive to said subtraction for indicating that a desired second hierarchical level from said list has been found and means for accessing the data in the memory at the beginning of said second hierarchical level and for subsequently extracting the desired third hierarchical segment of data from said memory.

6. A system as set forth in claim 1 including system clock means for controlling the locating of the desired first hierarchical level data group and the desired second hierarchical level data group therewithin utilizing the stored data list in said memory means under synchronous control of said clock and means operable to shift control for the actual accessing of the data in said serial memory to asynchronous system controls once said first and second hierarchical level data groups are ascertained to access the desired first hierarchical level data group in said memory, locate the desired second hierarchical level data group within said first hierarchical level data group and locate and read out the desired third hierarchical level data group from said memory.

7. A system as set forth in claim 6 wherein said clock comprises a plurality of single shot multivibrator stages wherein a fixed series of operations is achieved by causing the turn off of one stage to turn on the next stage wherein branching is obtained by testing a plurality of gate circuits with the turn off pulse of the stage at the branch point and turning on a selected next clock stage in accordance with the gate circuit which produced an output when interrogated by said turn off pulse.

8. A system as set forth in claim 1 above including means for entering said memory within a first hierarchical level data group at any second hierarchical level data group on which said memory is currently sitting and means to compare the particular second hierarchical level data group on which said system is sitting with the desired second hierarchical level data group and to automatically cause said system to proceed in the proper direction until said desired second hierarchical level data group is located.

9. A system as set forth in claim 8 above wherein said last named means includes a counter directly associated with each first hierarchical data group within the memory which indicates the current second hierarchical level data group within said first hierarchical level data group on which said memory is currently sitting, compare circuit means for receiving the indication from said last named means and the desired second hierarchical level indicator taken from said data list, said compare circuit means producing an output indicative of the direction in which the serial memory accessing means must move to reach the desired second hierarchical level data group in said memory.

10. A system as set forth in claim 1 wherein the means for determining whether a desired third hierarchical level data group lies within a particular second hierarchical level data group set forth in the data includes first register means for storing successive third hierarchical level data groups from said data list as new second hierarchical level groups are examined, second register means into which the number of the desired third hierarchical level data group from the program is stored, means for subtracting the contents of said second register means from the contents of said first register means each time a new second hierarchical level is encountered in the data list and restoring said result in said second register means, means for examining the contents of said second register means after a subtraction operation to determine whether the number therein is positive, negative or zero, means responsive to a positive indication for reaccessing the data list and obtaining a new second hierarchical level number and an indication of the number of third hierarchical level data groups are contained in same and placing said latter numbers in said first register means, and repeating said cycle until a zero or a negative number appears in said second register means, means responsive to the occurrence of a negative number in said second register means after a subtraction operation to initiate an addition operation wherein the contents of said second register means are added to the contents of said first register means and the result again stored in said second register means wherein the occurrence of a negative number or a zero in said second register means after a subtraction operation indicates that the second hierarchical level data group in which the desired third hierarchical level data group is located has been found and means operative to the completion of said addition operation to initiate the actual accessing of said data from the serial memory.

11. A system as set forth in claim 10 wherein said first hierarchical level comprises a tape unit, said second hierarchical level data group comprises a block on said tape unit and said third hierarchical level data groups comprise records within said individual blocks of data on said tape units.

References Cited

UNITED STATES PATENTS

| | | | |
|---|---|---|---|
| 3,018,472 | 1/1962 | Piloty | 340—172.5 |
| 3,107,343 | 10/1963 | Poole | 340—172.5 |
| 3,141,151 | 7/1964 | Gilson | 340—172.5 |
| 3,221,307 | 11/1965 | Manning | 340—172.5 |
| 3,307,153 | 2/1967 | Bauer | 340—172.5 |

ROBERT C. BAILEY, *Primary Examiner.*

O. E. TODD, I. S. KAVRUKOV, *Assistant Examiners.*